(12) United States Patent
Sarwar et al.

(10) Patent No.: US 9,166,868 B2
(45) Date of Patent: Oct. 20, 2015

(54) DISTRIBUTED CONTROL PLANE FOR LINK AGGREGATION

(75) Inventors: Muhammad S. Sarwar, Brookfield, CT (US); Zanjun Lu, Edison, NJ (US); Zigmunds Andis Putnins, Ridgewood, NJ (US); Jaya Sarup, Monroe, NY (US)

(73) Assignee: Fujitsu Limited, Kawasaki-shi (JP)

( * ) Notice: Subject to any disclaimer, the term of this patent is extended or adjusted under 35 U.S.C. 154(b) by 871 days.

(21) Appl. No.: 13/313,748

(22) Filed: Dec. 7, 2011

(65) Prior Publication Data

US 2013/0148512 A1      Jun. 13, 2013

(51) Int. Cl.
*H04L 12/26* (2006.01)
*H04L 12/24* (2006.01)

(52) U.S. Cl.
CPC .................. *H04L 41/042* (2013.01)

(58) Field of Classification Search
CPC .................. H04J 3/14; H04L 12/26
See application file for complete search history.

(56) References Cited

U.S. PATENT DOCUMENTS

2008/0089236 A1* 4/2008 Kotrla et al. .................. 370/242

OTHER PUBLICATIONS

IEEE; "802.1AX-2008"; Link Aggregation; IEEE Computer Society; pp. 163, Nov. 3, 2008.

* cited by examiner

*Primary Examiner* — Andrew Lai
*Assistant Examiner* — Leon Andrews
(74) *Attorney, Agent, or Firm* — Baker Botts L.L.P.

(57) ABSTRACT

In accordance with embodiments of the disclosure, a method may include communicating, via an inter-card communication channel, local link status information regarding at least one local physical port resident on a first network interface, wherein the at least one local physical port is a member port of a link aggregation group, to one or more other network interfaces, other than the first network interface, having member ports of the link aggregation group. The method may also include receiving, via the inter-card communications channel, non-local link status information regarding at least one non-local physical port resident on the one or more other network interfaces, wherein the at least one non-local physical port is a member port of the link aggregation group. The method may further include designating a link status of the at least one local physical port based on the local link status information and the non-local link status information.

21 Claims, 4 Drawing Sheets

DISTRIBUTED CONTROL PLANE FOR LINK AGGREGATION

TECHNICAL FIELD

This invention relates generally to the field of communications systems and more specifically to processing of communication of management traffic over a link aggregation group interface for a network element with distributed architecture.

BACKGROUND

A communication network may include network elements that route packets through the network. Some network elements may include a distributed architecture, wherein packet processing may be distributed among several subsystems of the network element (e.g., line cards, switches, etc.).

In many instances, communication networks may employ link aggregation. Link aggregation (e.g., IEEE 802.1AX-2008) may generally describe the practice of using multiple network cables or ports in parallel to increase the link speed beyond the limits of any one single cable or port. Link aggregation may also be used to provide fault protection by increasing redundancy for higher availability (e.g., by designating one or more "active" physical ports for carrying traffic and one or more "standby" physical ports for redundancy in the event of failure of an active port. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

Traditionally, control the various physical ports of a LAG and their statuses (e.g., active or standby) has been centralized, such that one line card of a plurality of line cards is designated as a "master", maintaining status information and controlling ports for itself and the other line card, which may be designated as "slave" cards. However, such traditional approach has many disadvantages. For instance the centralized control plane may exist on a multiple line-card system and require powerful processing resources and a high-throughput communication channel to achieve real-time performance, which may lead to high hardware costs. Additionally, such centralized control may require complex synchronization among the various line cards, presenting challenges in developing and maintaining synchronization as well as high software costs. Further, in such centralized control, the master line card may be a single point of failure, and failure of the master line card may cause loss of link protection on an entire network element.

SUMMARY OF THE DISCLOSURE

In accordance with the present invention, disadvantages and problems associated with control of members in a link aggregation group may be reduced or eliminated.

In accordance with embodiments of the disclosure, a method may include communicating, via an inter-card communication channel, local link status information regarding at least one local physical port resident on a first network interface, wherein the at least one local physical port is a member port of a link aggregation group, to one or more other network interfaces, other than the first network interface, having member ports of the link aggregation group. The method may also include receiving, via the inter-card communications channel, non-local link status information regarding at least one non-local physical port resident on the one or more other network interfaces, wherein the at least one non-local physical port is a member port of the link aggregation group. The method may further include designating a link status of the at least one local physical port based on the local link status information and the non-local link status information.

One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which.

DETAILED DESCRIPTION OF THE DRAWINGS

Embodiments of the present invention and its advantages are best understood by referring to FIGS. 1-5, like numerals being used for like and corresponding parts of the various drawings.

Figure 1:
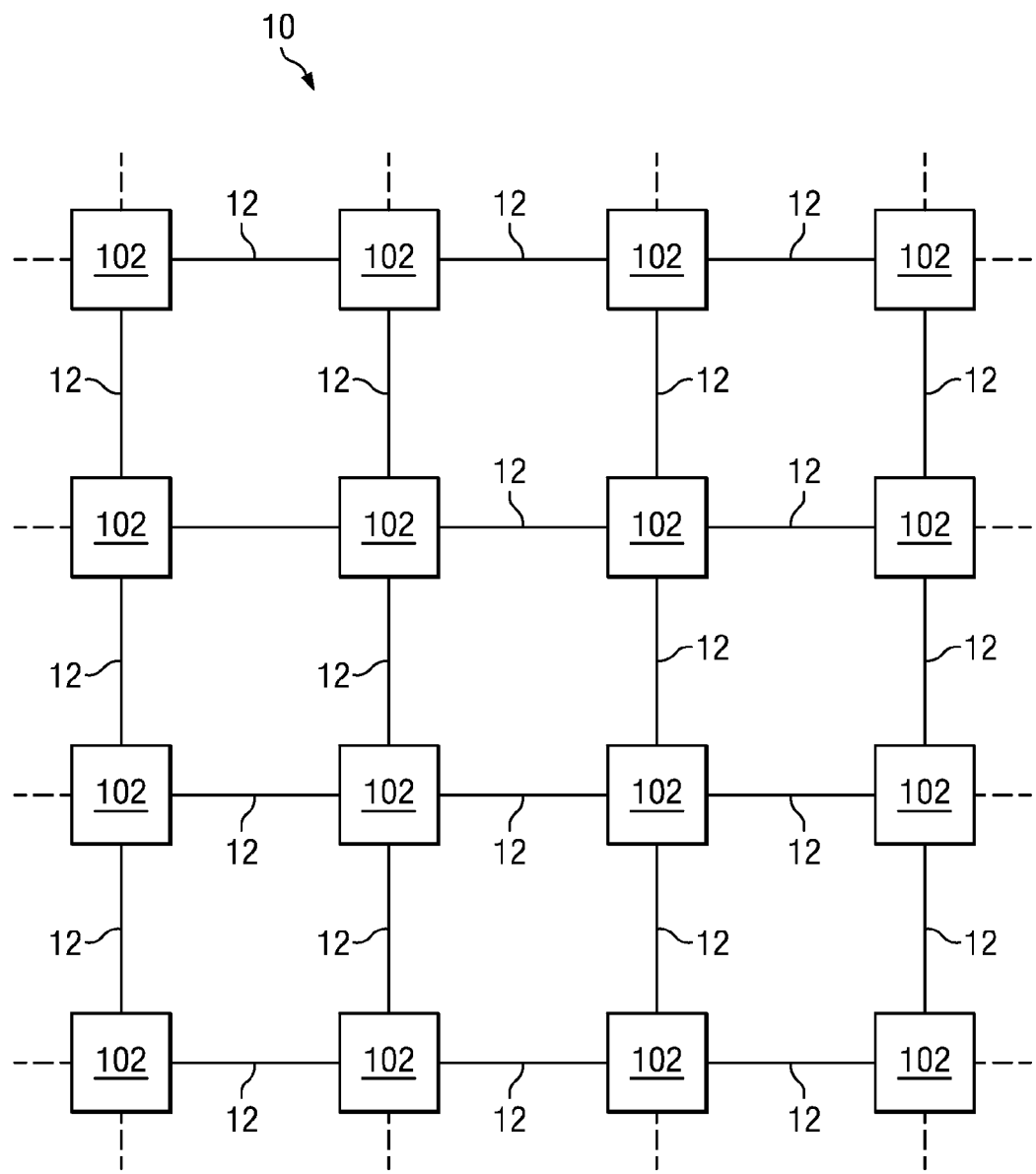
FIG. 1 illustrates a block diagram of an example network, in accordance with certain embodiments of the present disclosure.

FIG. 1 illustrates a block diagram of an example network 10, in accordance with certain embodiments of the present disclosure. In certain embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a Ti cable, a WiFi signal, a Bluetooth signal, or other suitable medium. In some embodiments, one or more transmission media 12 may be part of a link aggregation group (LAG), in which case multiple physical transmission media 12 may exist coupling network devices 102 despite the fact that the multiple transmission media 12 may logically appear as a single transmission medium to components of network 10 external to the LAG.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
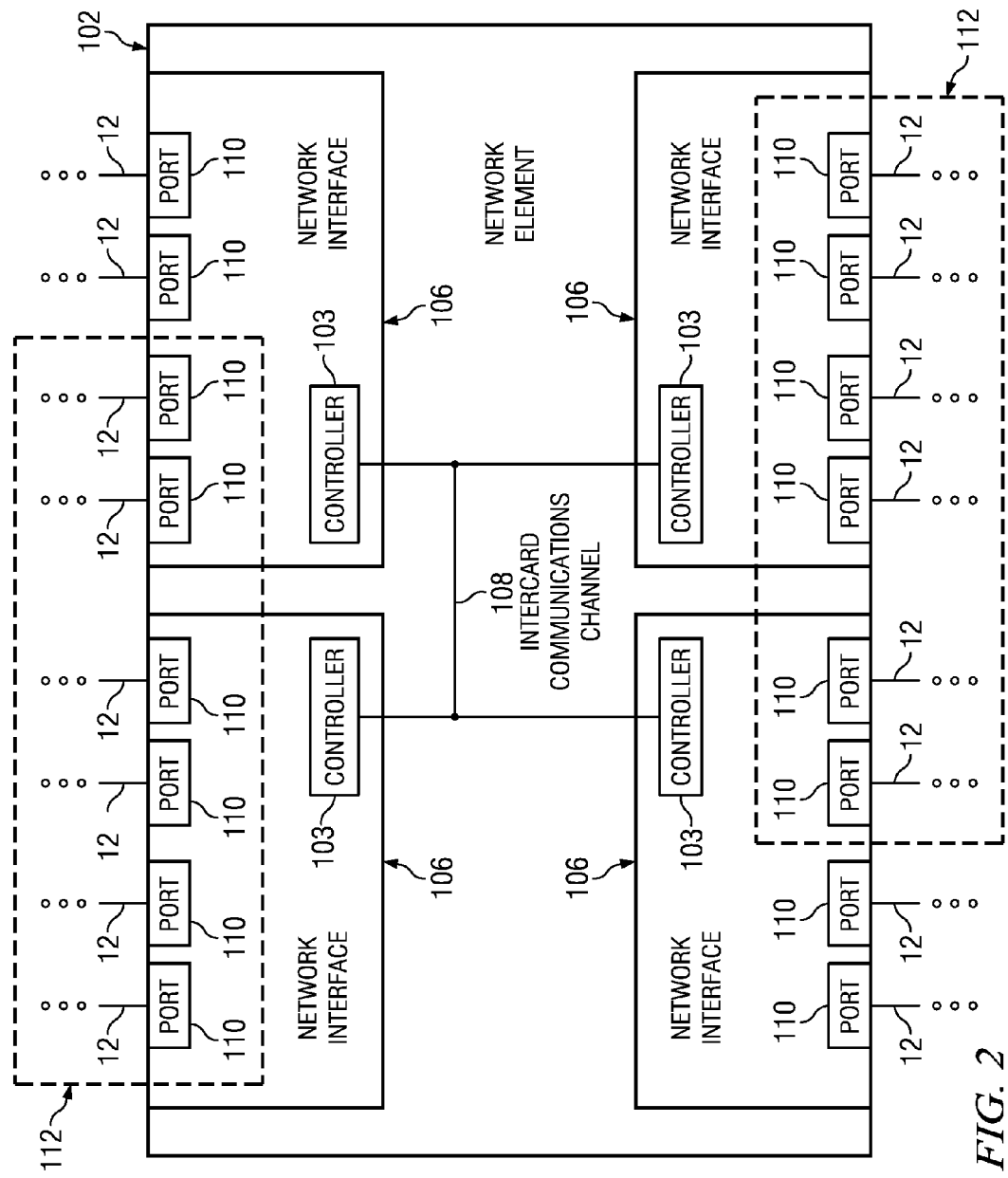
FIG. 2 illustrates a block diagram an example network element, in accordance with certain embodiments of the present disclosure.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include one or more network interfaces 106 communicatively and an inter-card communication channel 108 communicatively coupling the one or more network interfaces 106 to each other.

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110 and controller 103. Each physical port 110 may include any system, device or apparatus configured to serve as a physical interface between a corresponding transmission medium 12 and network interface 106. For example, a physical port 110 may comprise an Ethernet port, an optical port, or any other suitable port.

As shown in FIG. 2, two or more physical ports 110 of a particular network element 102, their corresponding physical ports 110 of another network element 102, and their corresponding transmission media 12 may be grouped into a link aggregation group (LAG) 112. Although each LAG 112 in FIG. 2 is depicted as including a particular number of member physical ports 110, LAG 112 may include any suitable number of member physical ports 110. LAG 112 may combine its member ports or member LAGs using link aggregation such that the member ports are represented as a single logical port to components of network 10 external to LAG 112.

A controller 103 may include any system, device, or apparatus configured to control link aggregation of ports 110 of its associated network interface 106, as described in greater detail herein. In some embodiments, a controller 103 may be configured to interpret and/or execute program instructions and/or process data for carrying out functionality of controller 103, and may include, without limitation a microprocessor, microcontroller, digital signal processor (DSP), application specific integrated circuit (ASIC), or any other digital or analog circuitry configured to interpret and/or execute program instructions and/or process data. In addition, controller 103 may include any suitable system, apparatus, or device configured to receive traffic via a port 110 of a network element 106 and route such traffic to a particular network interface 106 and/or port 110 based on analyzing the contents of the data and/or based on a characteristic of a signal carrying the data (e.g., a wavelength and/or modulation of the signal).

A controller 103 may implement LACP. The standard LACP (e.g., per IEEE 802.1AX-2008) may be extended to enable LACP to execute among multiple controllers 103 concurrently within network element 102 (e.g., each controller 103 executes its own LACP complex). However, from a system point of view (e.g., from a point of view external to network element 102), the multiple controllers 103 may appear to function as a single controller.

Inter-card communications channel 108 may be any suitable bus or other communications channel whereby network interfaces 106 may communicate with each other Link Aggregation Control Protocol (LACP) information (e.g., LACP packet data units) and/or information regarding link aggregation events (e.g., a loss of signal event for a particular port 110). Network interfaces 106 may communicate via inter-card communications channel 108 via an inter-card communications channel (ICC) protocol. The ICC protocol may be a proprietary protocol. Certain information communicated between network interfaces 106 may be communicated in the form of an ICC LINK message type-length-value (TLV). Such message may include information including, without limitation, identifying information of a port 110 on a network element 106 of which the message originates (e.g., "slot-port" information of an access identifier (AID) for the port 110), a physical status of a link associated with the port 110 (e.g., link up, down, etc.), link selection logic status of the port 110 (e.g., whether the port 110 is an active or standby port of a LAG).

Figure 3:
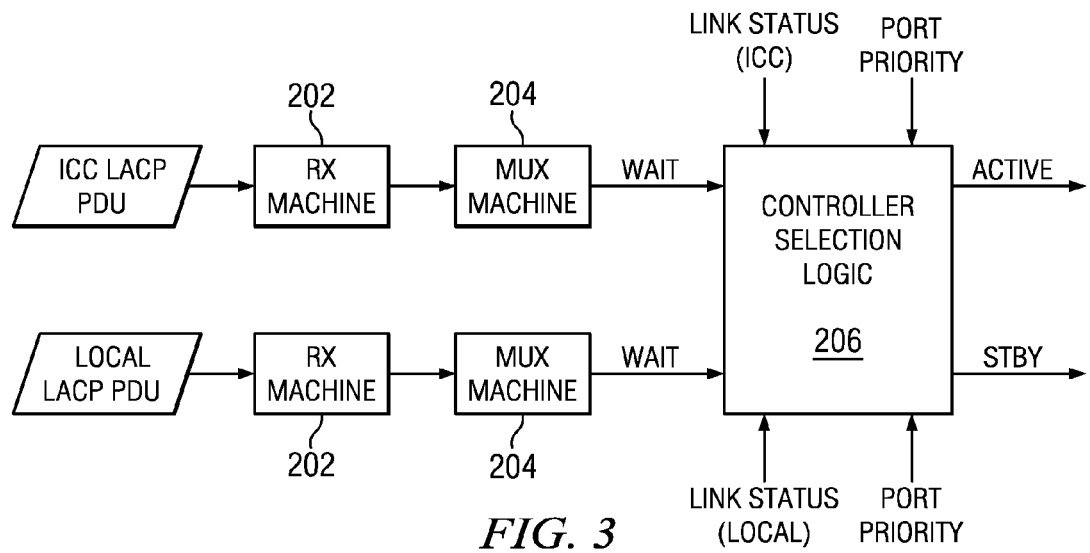
FIG. 3 illustrates a flow diagram for selection of a link aggregation status for a port from the perspective of a controller local to a network interface, in accordance with certain embodiments of the present disclosure.
Figure 4:
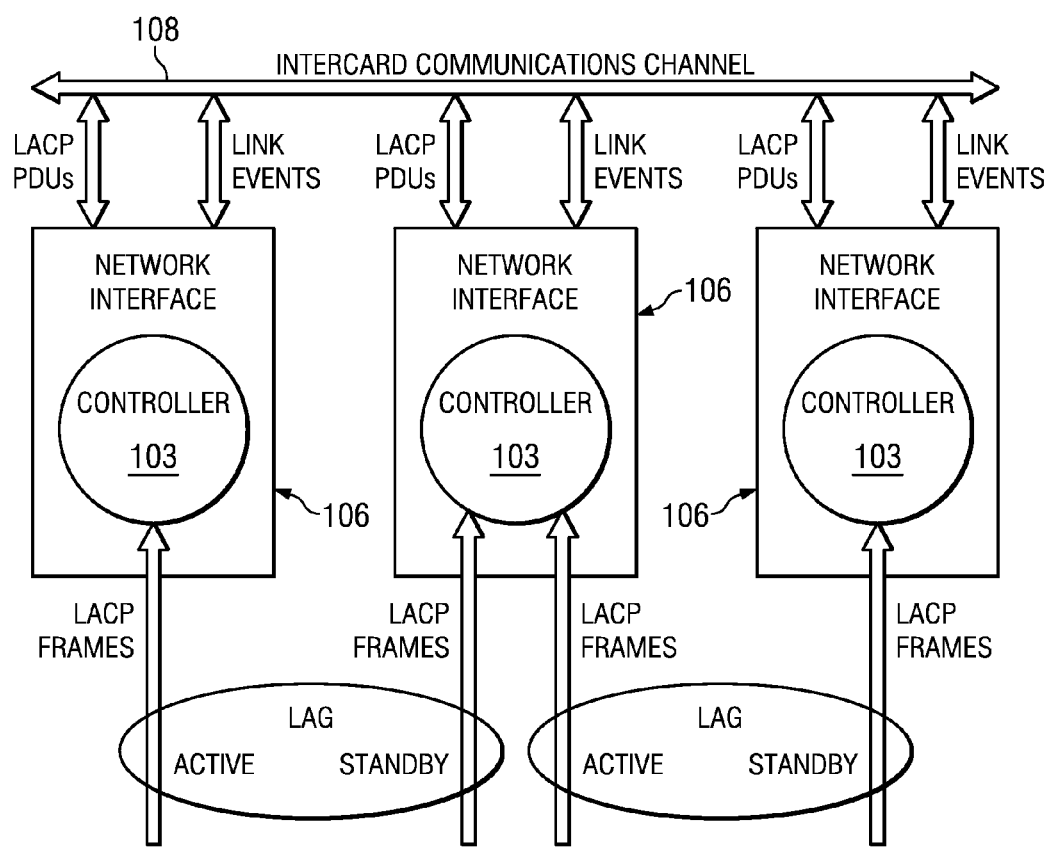
FIG. 4 illustrates a flow chart of an example method of selecting link aggregation status for a local port in accordance with certain embodiments of the present disclosure.

In operation, each controller 103 may have an equally global view of resources associated with a link aggregation group in which its associated ports 110 participate. In addition, each controller 103 may execute its own selection logic based on control information received by such controller 103 (e.g., LACP frames or packet data units received via a port 110 and/or from another network interface 106 via inter-card communications channel 108, indications of link status from another network interface 106 via inter-card communications channel 108) order to select a LAG status of its associated ports 110 (e.g., determine whether such ports 110 are to be active or passive ports 110). FIGS. 3 and 4 illustrate an example of such LAG status selection.

FIG. 3 sets forth a flow diagram for selection of a LAG status for a port 110 from the perspective of a controller 103 local to a network interface 106, in accordance with certain embodiments of the present disclosure. All of the functionality described with respect to FIG. 3 may be performed by each controller 103 and/or any other suitable component of a network interface 106.

As is known in the art, the IEEE-802.1AX-2008 provides for a Receive Machine, a Mux Machine, and Selection Logic as LACP state machines. A Receive Machine receives LACP packet data units (PDUs) from a far end port, records the information contained, and times out the information according to an appropriate time out setting set in accordance with LACP. The Receiver Machine may also evaluate the incoming information from the far end to determine whether both ends have both agreed upon the protocol information exchanged to the extent that the port can now be safely used. A Mux Machine may be responsible for attaching the port to a selected Aggregator, detaching the port from a de-selected Aggregator, and for enabling receiving/transmitting at the port on/off as required by current protocol information. Selection Logic may be responsible for selecting the Aggregator to be associated with the port.

A controller 103 may maintain LACP Receive state machines 202 (one for each of LACP information received via a local port 110 and LACP information received via inter-card communications channel 108) based on LACP frames or packet data units received via a local port 110 and via inter-card communications channel 108. Upon receipt of an LACP frame, each Mux state machine 204 (one for each of LACP information received via a local port 110 and LACP information received via inter-card communications channel 108) may initiate a Wait_While_Timer (WWT) or similar timer for selection logic 206. Such timer may be of any suitable duration. During duration of the timer, a controller 103 may monitor link status information (e.g., whether links associated with ports 110 are up or down, port priority of various ports 110) of both ports 110 local to a network interface 106 and ports 110 non-local to the network interface 106 via inter-card communications channel 106. Based on such monitored link status information, controller Selection Logic 206 may determine the link status of a local port 110.

Thus, in FIG. 3, these existing component of the LACP standard may be extended or provided with particular information in order to construct a controller subsystem loosely coupled with other partner controllers, and all these controller subsystems form a system as depicted in FIG. 2, and may interface with other system (e.g., other network elements 102) as a single Link Aggregation Group as shown in FIG. 4.

Figure 5:
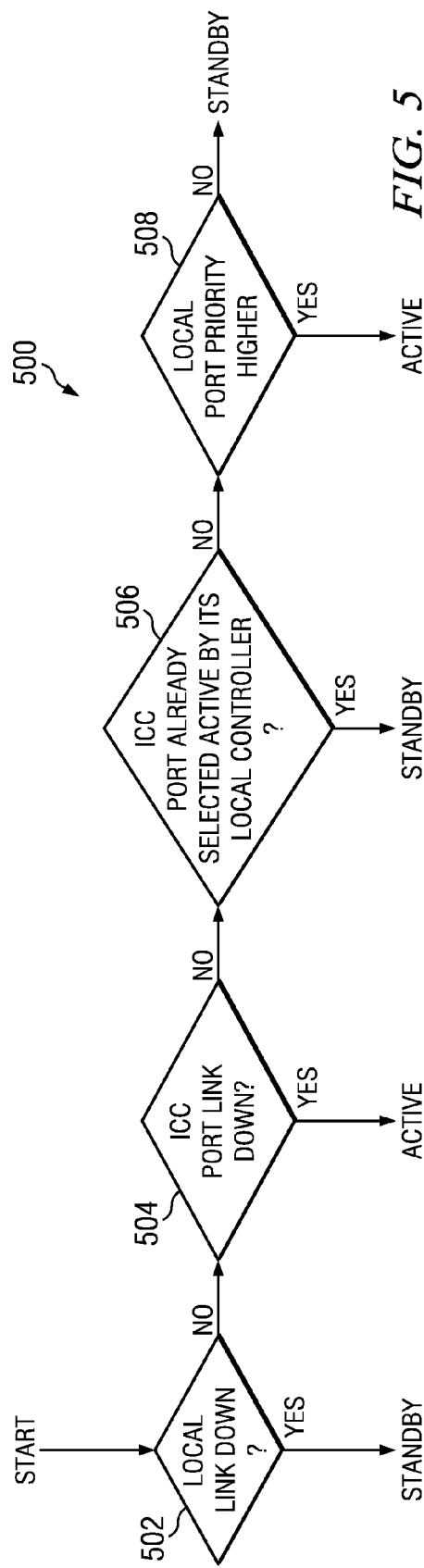
FIG. 5 illustrates a flow diagram for selection of a link status for a local port, in accordance with embodiments of the present disclosure.

An example of a method 500 of selecting link status for a local port 110 is depicted in FIG. 5. Industry-standard selection logic may be modified to include method 500 depicted in FIG. 5. In particular, the method depicted in FIG. 5 may apply in the case of a 1:1 LAG having a working path and protected path. As shown in FIG. 5, method 500 may begin at step 502, where controller 103 may determine, based on link status information, whether a link associated with a local port 110 is down (e.g., experiencing a loss of signal). If the controller 103 determines the local port 110 link is down, it may set the link aggregation status of the local port to "standby." Otherwise, method 500 may proceed to step 504.

At step 504, controller 103 may determine, based on link status information received via inter-card communications channel 108, whether a non-local port 110 (e.g., a port 110 of another network element 106) is down (e.g., experiencing a loss of signal). If controller 103 determines the non-local port 110 link is down, it may set the link aggregation status of the local port to "active." Otherwise, method 500 may proceed to step 506.

At step 506, controller 103 may determine, based on link status information received via inter-card communications channel 108, whether a non-local port 110 (e.g., a port 110 of another network element 106) is designated by its own local controller as an active port of a link aggregation group for which a local port 110 is a member. If controller 103 determines that the non-local port 110 is active, it may set the link aggregation status of the local port to "standby." Otherwise, method 500 may proceed to step 508.

At step 508, controller 103 may determine, whether the port priority of the local port 110 is higher than that of the non-local port 110. If the local port 110 has a higher priority, controller 103 may set the status of the local port to "active." Otherwise, controller 103 may set the status of the local port to "standby."

A component of network 10 and/or a network element 102 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Certain embodiments of the invention may provide one or more technical advantages. A technical advantage of one embodiment may be that a distributed hardware-based approach may be used to process heartbeat messages communicated through a link aggregation group.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
   an inter-card communications channel between a plurality of network interfaces within the network element, the inter-card communications channel enabling communications between the plurality of network interfaces;
   the plurality of network interfaces communicatively coupled to each other via the inter-card communications channel and including, in aggregate, a plurality of physical ports, each particular network interface configured to:
   communicate, via the inter-card communications channel, local link status information regarding at least one local physical port resident on the particular network interface, wherein the at least one local physical port is a member port of a link aggregation group, to one or more other network interfaces of the plurality of network interfaces having member ports of the link aggregation group;
   receive, via the inter-card communications channel, non-local link status information regarding at least one non-local physical port resident on one or more other network interfaces of the plurality of network interfaces, wherein the at least one non-local physical port is a member port of the link aggregation group; and
   based on the local link status information and the non-local link status information, designate a link status of the at least one local physical port.

2. The network element according to claim 1, wherein designating the link status of the at least one physical port comprises designating the at least one physical port as either of an active port or a standby port.

3. The network element according to claim 1, wherein the local link status information includes information regarding a port priority of the at least one local physical port.

4. The network element according to claim 1, wherein the non-local link status information includes information regarding a port priority of the at least one non-local physical port.

5. The network element according to claim 1, wherein the local link status information includes information regarding whether the at least one local port is designated as an active port or a standby port.

6. The network element according to claim 1, wherein the non-local link status information includes information regarding whether the at least one non-local port is designated as an active port or a standby port.

7. The network element according to claim 1, wherein the non-local link status information includes information regarding whether the at least one non-local port is down.

8. A method comprising:
   establishing an inter-card communications channel between a plurality of network interfaces within a network element, the inter-card communications channel enabling communications between the plurality of network interfaces;
   communicating, by the network element via the inter-card communications channel, local link status information regarding at least one local physical port resident on a first network interface, wherein the at least one local physical port is a member port of a link aggregation group, to one or more other network interfaces, other than the first network interface, having member ports of the link aggregation group;
   receiving, via the inter-card communications channel in the network element, non-local link status information regarding at least one non-local physical port resident on the one or more other network interfaces, wherein the at least one non-local physical port is a member port of the link aggregation group; and
   based on the local link status information and the non-local link status information, by the network element designating a link status of the at least one local physical port.

9. The method according to claim 8, wherein designating the link status of the at least one physical port comprises designating the at least one physical port as either of an active port or a standby port.

10. The method according to claim 8, wherein the local link status information includes information regarding a port priority of the at least one local physical port.

11. The method according to claim 8, wherein the non-local link status information includes information regarding a port priority of the at least one non-local physical port.

12. The method according to claim 8, wherein the local link status information includes information regarding whether the at least one local port is designated as an active port or a standby port.

13. The method according to claim 8, wherein the non-local link status information includes information regarding whether the at least one non-local port is designated as an active port or a standby port.

14. The method according to claim 8, wherein the non-local link status information includes information regarding whether the at least one non-local port is down.

15. An article of manufacture comprising:
   a non-transitory computer readable medium; and
   computer-executable instructions carried on the computer readable medium, the instructions readable by a processor, the instructions, when read and executed, for causing the processor to:
   establish an inter-card communications channel between a plurality of network interfaces within a network element, the inter-card communications channel enabling communications between the plurality of network interfaces;
   communicate, via the inter-card communications channel, local link status information regarding at least one local physical port resident on a first network interface, wherein the at least one local physical port is a member port of a link aggregation group, to one or more other network interfaces, other than the first network interface, having member ports of the link aggregation group;
   receive, via the inter-card communications channel, non-local link status information regarding at least one non-local physical port resident on the one or more other network interfaces, wherein the at least one non-local physical port is a member port of the link aggregation group; and
   based on the local link status information and the non-local link status information, designate a link status of the at least one local physical port.

16. The article of manufacture according to claim 15, wherein designating the link status of the at least one physical port comprises designating the at least one physical port as either of an active port or a standby port.

17. The article of manufacture according to claim 15, wherein the local link status information includes information regarding a port priority of the at least one local physical port.

18. The article of manufacture according to claim 15, wherein the non-local link status information includes information regarding a port priority of the at least one non-local physical port.

19. The article of manufacture according to claim 15, wherein the local link status information includes information regarding whether the at least one local port is designated as an active port or a standby port.

20. The article of manufacture according to claim 15, wherein the non-local link status information includes information regarding whether the at least one non-local port is designated as an active port or a standby port.

21. The article of manufacture according to claim 15, wherein the non-local link status information includes information regarding whether the at least one non-local port is down.

* * * * *